(12) United States Patent
Kasa et al.

(10) Patent No.: US 8,305,937 B2
(45) Date of Patent: Nov. 6, 2012

(54) REPEATER AND REPEATING METHOD

(75) Inventors: Masamichi Kasa, Fukuoka (JP);
Shinichi Shiwachi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 395 days.

(21) Appl. No.: 12/694,341

(22) Filed: Jan. 27, 2010

(65) Prior Publication Data

US 2010/0158011 A1 Jun. 24, 2010

Related U.S. Application Data

(63) Continuation of application No. PCT/JP2007/064784, filed on Jul. 27, 2007.

(51) Int. Cl.
*H04L 12/28* (2006.01)
(52) U.S. Cl. ......................... 370/255; 370/397
(58) Field of Classification Search .......... 370/254–256, 370/384, 351, 395.53, 397, 399, 395.3; 709/236, 709/220, 249
See application file for complete search history.

(56) References Cited

U.S. PATENT DOCUMENTS

| | | | |
|---|---|---|---|
| 7,400,634 B2 * | 7/2008 | Higashitaniguchi et al. | 370/395.53 |
| 7,532,634 B2 * | 5/2009 | Higashitaniguchi et al. | 370/404 |
| 7,580,407 B2 * | 8/2009 | Shimada | 370/389 |
| 2005/0243845 A1 * | 11/2005 | Higashitaniguchi et al. | 370/404 |
| 2005/0270986 A1 | 12/2005 | Watanabe et al. | |
| 2006/0002311 A1 | 1/2006 | Iwanaga et al. | |
| 2006/0092860 A1 * | 5/2006 | Higashitaniguchi et al. | 370/255 |
| 2008/0075076 A1 * | 3/2008 | Shimada | 370/389 |
| 2008/0239957 A1 | 10/2008 | Tokura et al. | |

FOREIGN PATENT DOCUMENTS

| | | |
|---|---|---|
| JP | 11-177601 | 7/1999 |
| JP | 2002-183216 | 6/2002 |
| JP | 2005-64710 | 3/2005 |
| JP | 2005-303410 | 10/2005 |
| JP | 2005348051 | 12/2005 |
| JP | 2006-19866 | 1/2006 |
| JP | 2006-129036 | 5/2006 |
| WO | 2005004407 | 1/2005 |

OTHER PUBLICATIONS

International Search Report dated Aug. 28, 2007, from the corresponding International Application.
Notice of Rejections dated Jul. 3, 2012, from the corresponding Japanese Application No. 2009-525195.

* cited by examiner

*Primary Examiner* — Chuong T Ho
(74) *Attorney, Agent, or Firm* — Katten Muchin Rosenman LLP

(57) ABSTRACT

A repeater stores retrieval situation of an address retrieved as an address identical with the transmission destination address of the reception frame in association with each address registered in the learning table, refers to, when the transmission source address of the received frame is registered in the learning table, the retrieval situation of the address stored in association with a port identical with the port that receives the frame from among retrieval situations, specifies an address to be overwritten by the transmission source address of the reception frame, overwrites and registers the transmission source address of the reception frame on the specified address, and updates, when the address identical with the transmission destination address of the received frame is retrieved from the learning table, the retrieval situation stored in association with the retrieved address.

7 Claims, 13 Drawing Sheets

FIG.3

| PORT NUMBER | TABLE NUMBER | ADDRESS | RETRIEVAL LAPSE TIME |
|---|---|---|---|
| | | LEARNING TABLE ⟨12a | RETRIEVAL SITUATION STORAGE TABLE ⟨12b |
| P1 | 1 | ADDRESS OF TERMINAL 1-1 | 1 |
| | 2 | ADDRESS OF TERMINAL 1-2 | 12 |
| | ... | | |
| | 100 | ADDRESS OF TERMINAL 1-100 | 5 |
| P2 | 101 | ADDRESS OF TERMINAL 2-1 | 3 |
| | 102 | | |
| | ... | | |
| | 200 | | |
| P3 | 201 | ADDRESS OF TERMINAL 3-1 | 7 |
| | 202 | | |
| | ... | | |
| | 300 | | |
| P4 | 301 | ADDRESS OF TERMINAL 4-1 | 0 |
| | 302 | | |
| | ... | | |
| | 400 | | |

FIG.8

| LEARNING TABLE 12a | | | RETRIEVAL SITUATION STORAGE TABLE 12b |
|---|---|---|---|
| PORT NUMBER | TABLE NUMBER | ADDRESS | NUMBER OF RETRIEVALS |
| P1 | 1 | ADDRESS OF TERMINAL 1-1 | 7 |
| | 2 | ADDRESS OF TERMINAL 1-2 | 1 |
| | ... | | |
| | 100 | ADDRESS OF TERMINAL 1-100 | 5 |
| P2 | 101 | ADDRESS OF TERMINAL 2-1 | 3 |
| | 102 | | |
| | ... | | |
| | 200 | | |
| P3 | 201 | ADDRESS OF TERMINAL 3-1 | 2 |
| | 202 | | |
| | ... | | |
| | 300 | | |
| P4 | 301 | ADDRESS OF TERMINAL 4-1 | 6 |
| | 302 | | |
| | ... | | |
| | 400 | | |

FIG.9

| TABLE NUMBER | NUMBER OF COUNTS |
|---|---|
| 1 | 7 |
| 2 | 1 |
| ... | |
| 100 | 5 |
| 101 | 3 |
| 102 | |
| ... | |
| 200 | |
| 201 | 2 |
| 202 | |
| ... | |
| 300 | |
| 301 | 6 |
| 302 | |
| ... | |
| 400 | |

FIG.12

| PORT NUMBER | TABLE NUMBER | LEARNING TABLE ADDRESS | RETRIEVAL SITUATION STORAGE TABLE RETRIEVAL LAPSE TIME | REGISTRATION LAPSE TIME STORAGE TABLE REGISTRATION LAPSE TIME |
|---|---|---|---|---|
| P1 | 1 | ADDRESS OF TERMINAL 1-1 | 1 | 10 |
| | 2 | ADDRESS OF TERMINAL 1-2 | 12 | 7 |
| | ... | ... | | |
| | 100 | ADDRESS OF TERMINAL 1-100 | | |
| P2 | 101 | ADDRESS OF TERMINAL 2-1 | 5 | 1 |
| | 102 | | 3 | 8 |
| | ... | ... | | |
| | 200 | | | |
| P3 | 201 | ADDRESS OF TERMINAL 3-1 | 7 | 6 |
| | 202 | | | |
| | ... | ... | | |
| | 300 | | | |
| P4 | 301 | ADDRESS OF TERMINAL 4-1 | 0 | 4 |
| | 302 | | | |
| | ... | ... | | |
| | 400 | | | |

12a / 12b / 12c

REPEATER AND REPEATING METHOD

CROSS-REFERENCE TO RELATED APPLICATION(S)

This application is a continuation of International Application No. PCT/JP2007/064784, filed on Jul. 27, 2007, the entire contents of which are incorporated herein by reference.

FIELD

The embodiments discussed herein are directed to a repeater, a repeating method, and a repeating program.

BACKGROUND

There is conventionally known a repeater that extracts, when receiving a frame, the transmission destination address of the frame, retrieves a port to which a terminal corresponding to the transmission destination address is connected, and repeats the frame via the retrieved port.

For example, Japanese Laid-open Patent Publication No. 2005-303410 and Japanese Laid-open Patent Publication No. 2006-129036 disclose a technology for providing a learning table that registers, each time a frame is received, the transmission source address of the frame in association with a reception port, retrieving an address identical with the transmission destination address of the reception frame from the learning table, and repeating the frame via a port corresponding to the retrieved address.

However, the conventional technology has a problem in that communication efficiency of a network is degraded because a transmission source address is overwritten on an address stored in the learning table to be registered in the learning table regardless of frequency by which the address stored in the learning table is identical with the transmission destination address of the reception frame.

In other words, in the conventional technology, when a transmission source address is overwritten on an address stored in the learning table to be registered in the learning table, the transmission source address is overwritten on an address of which the registration lapse time is the longest among addresses registered in association with a port number of a port identical with the reception port. The registration lapse time is a time for which an address is held in the learning table after the address is last registered in the learning table.

Therefore, in the conventional technology, an address that is identical with a transmission destination address of a reception frame at high frequency can be overwritten by a transmission source address of a newly received frame and be deleted from the learning table only because the registration lapse time of the address is the longest.

As a result, the conventional technology has a problem in that communication efficiency of a network is degraded because traffic is excessively increased by frequently performing a process (hereinafter, flooding process) of copying and repeating a frame through all ports other than a port that receives the frame. The flooding process is a process of repeating a frame when an address identical with a transmission destination address is not registered in the learning table.

SUMMARY

According to an aspect of an embodiment of the invention, a repeater includes a learning table for registering, each time a reception frame is received, a transmission source address of the reception frame in association with a reception port, a control unit that retrieves an address identical with a transmission destination address of the reception frame from the learning table to repeat the reception frame via a port corresponding to the retrieved address, a retrieval situation storage unit that stores a retrieval situation of an address retrieved as the address identical with the transmission destination address of the reception frame in association with each address registered in the learning table, an address specifying unit that refers to, when registering the transmission source address of the received frame in the learning table, a retrieval situation of an address stored in association with a port identical with a port that receives the frame among retrieval situations stored in the retrieval situation storage unit and specifies an address to be overwritten by the transmission source address of the reception frame, an address registering unit that overwrites and registers the transmission source address of the reception frame on the address specified by the address specifying unit, and a retrieval situation updating unit that updates, when retrieving the address identical with the transmission destination address of the received frame from the learning table, the retrieval situation stored in the retrieval situation storage unit in association with the retrieved address.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of information registered in a learning table and a retrieval situation storage table according to the first embodiment;

FIG. 8 is a diagram illustrating an example of information registered in a learning table and a retrieval situation storage table according to the second embodiment;

FIG. 9 is a diagram illustrating an example of information held in a number-of-retrievals holding unit;

FIG. 12 is a diagram illustrating an example of information registered in a learning table, a retrieval situation storage table, and a registration lapse time storage table according to the fourth embodiment.

DESCRIPTION OF EMBODIMENT(S)

Preferred embodiments of the present invention will be explained with reference to accompanying drawings.

[a] First Embodiment

Outline and Feature of Repeater

Figure 1:
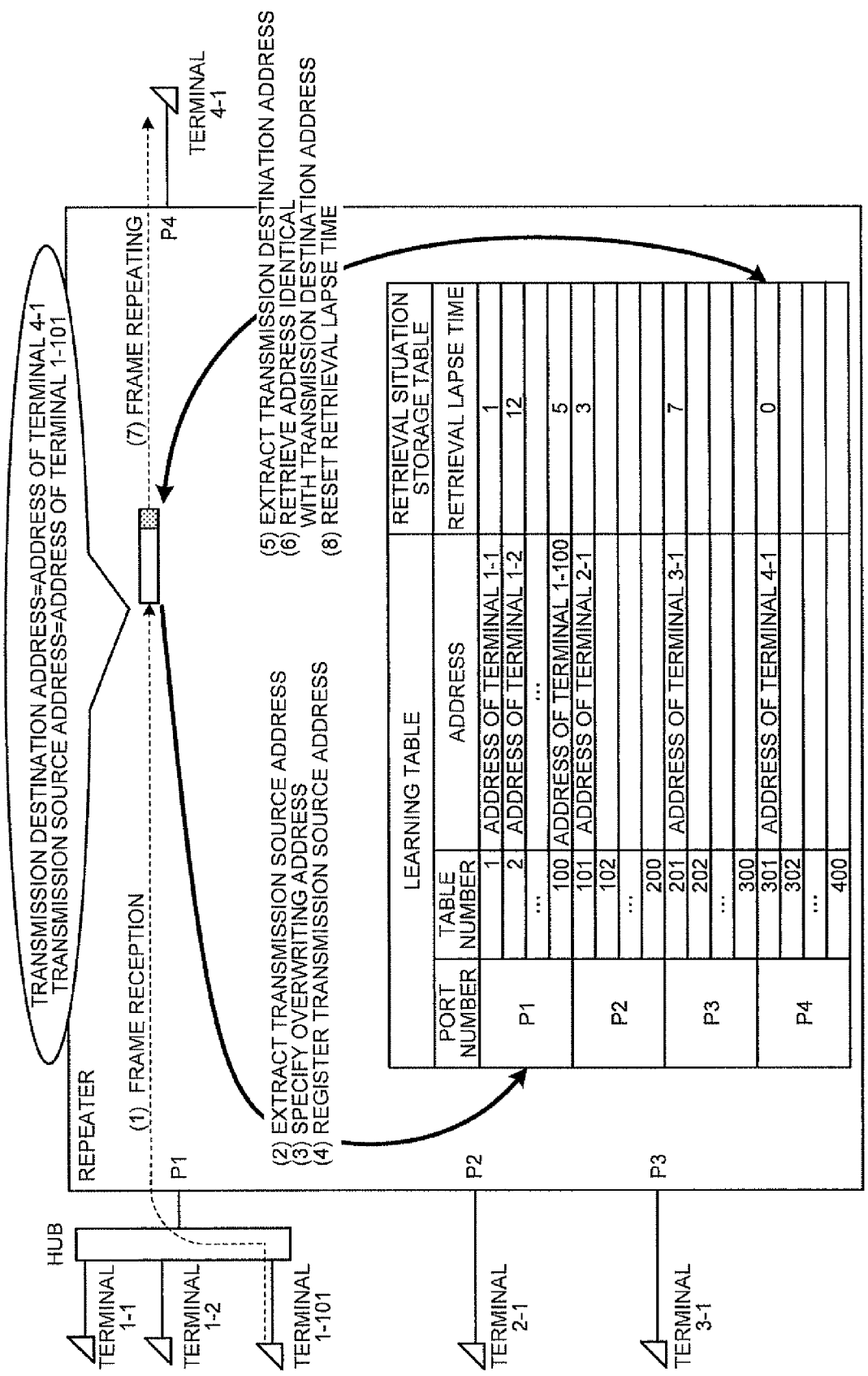
FIG. 1 is a diagram for explaining an outline and features of a repeater according to a first embodiment.

First, it will be explained about the outline and feature of a repeater according to a first embodiment of the present invention with reference to FIG. 1. FIG. 1 is a diagram for explaining the outline and feature of the repeater according to the first embodiment.

The repeater according to the first embodiment includes a learning table for registering, each time a frame is received from a terminal device connected to the repeater in a communicable manner, the transmission source address of the frame in association with a reception port. The repeater retrieves an address identical with the transmission destination address of the reception frame from the learning table and repeats the reception frame to another terminal device via a port corresponding to the retrieved address. In this way, the repeater of the first embodiment can repeat a frame without degrading communication efficiency of a network.

Specifically, the repeater according to the first embodiment stores a retrieval situation of an address, which is retrieved as an address identical with the transmission destination address of a reception frame, in association with each address registered in the learning table.

More specifically, as illustrated in FIG. 1, the repeater according to the first embodiment previously holds the learning table that registers a table number (for example, 1) and an address (for example, address of terminal 1-1) in association with a port number (for example, P1). Moreover, the repeater according to the first embodiment stores a retrieval lapse time (for example, 1), which is a lapse time for which an address registered in the learning table has passed after being last retrieved, in a retrieval situation storage table as a retrieval situation in association with each address.

The repeater according to the first embodiment updates each retrieval lapse time each time a predetermined time passes. Specifically, the repeater according to the first embodiment registers a numeric value "0" indicative of an initial value of a retrieval lapse time in association with each address in the retrieval situation storage table when registering each address in the learning table at the beginning. Furthermore, the repeater according to the first embodiment updates a retrieval lapse time by adding "1" to the retrieval lapse time each time a predetermined time passes. In this case, the unit of a retrieval lapse time (for example, 1) is a time. For example, the time indicates "second" or "minute" that is previously defined as a predetermined time.

The repeater according to the first embodiment receives a frame as illustrated in (1) of FIG. 1 and then extracts a transmission source address from the reception frame as illustrated in (2) of FIG. 1. As a specific example, when receiving a frame transmitted from a terminal 1-101 to a terminal 4-1 via a port number P1, the repeater according to the first embodiment extracts the address of the terminal 1-101 that is a transmission source address from the reception frame.

Next, as illustrated in (3) of FIG. 1, when registering the transmission source address of the reception frame in the learning table, the repeater according to the first embodiment refers to a retrieval lapse time of an address stored in association with a port number of a port identical with the reception port among retrieval lapse times stored in the retrieval situation storage table as retrieval situations, and specifies an address to be overwritten by the transmission source address of the reception frame.

Specifically, when registering the transmission source address of the reception frame in the learning table, the repeater according to the first embodiment refers to a retrieval lapse time of an address stored in association with a port number of a port identical with the reception port among retrieval lapse times stored in the retrieval situation storage table as retrieval situations, and specifies an address of which the retrieval lapse time is the longest as an overwriting address.

For example, when extracting the address of the terminal 1-101 that is a transmission source address from the frame received via the port number P1, the repeater according to the first embodiment refers to retrieval lapse times stored in the retrieval situation storage table in association with the addresses of the terminals 1-1 to 1-100 corresponding to the port number P1 and specifies the address of the terminal 1-2 of which the retrieval lapse time is the longest as an overwriting address. Then, the repeater according to the first embodiment acquires a table number 2 corresponding to the address of the specified terminal 1-2.

Furthermore, as illustrated in (4) of FIG. 1, the repeater according to the first embodiment overwrites the transmission source address of the reception frame on the overwriting address to register the transmission source address. Specifically, the repeater according to the first embodiment overwrites the transmission source address (the address of the terminal 1-101) extracted from the reception frame on an address registration field corresponding to the acquired table number (table number 2) to register the transmission source address.

Together with the process ((1) to (4) in FIG. 1) for registering a transmission source address of a reception frame in a learning table as described above, the repeater according to the first embodiment executes a process for repeating a reception frame. In other words, as illustrated in (5) of FIG. 1, the repeater extracts a transmission destination address from the reception frame. As a specific example, when receiving the frame transmitted from the terminal 1-101 to the terminal 4-1 via the port number P1, the repeater according to the first embodiment extracts the address of the terminal 4-1 that is a transmission destination address from the reception frame.

Next, as illustrated in (6) of FIG. 1, when the transmission destination address is extracted from the reception frame, the repeater according to the first embodiment refers to all addresses registered in the learning table and retrieves an address identical with the extracted transmission destination address. As a specific example, when the address of the terminal 4-1 that is a transmission destination address is extracted from the reception frame, the repeater according to the first embodiment refers to all addresses (the addresses of the terminals 1-1 to 1-100, 2-1, 3-1, and 4-1) registered in the learning table and retrieves the address of the terminal 4-1. Then, the repeater according to the first embodiment decides a port number P4 corresponding to the address of the terminal 4-1 as a port for repeating a frame.

Furthermore, as illustrated in (7) of FIG. 1, the repeater according to the first embodiment decides a port for repeating a frame and then repeats a frame. As a specific example, when deciding the port number P4 as a port for repeating a frame, the repeater according to the first embodiment repeats the frame via the port number P4.

As illustrated in (8) of FIG. 1, after repeating the frame, the repeater according to the first embodiment updates the retrieval situation stored in the retrieval situation storage table in association with the retrieved address. Specifically, when retrieving an address identical with the transmission destination address of the reception frame from the learning table, the repeater according to the first embodiment resets the retrieval lapse time stored in the retrieval situation storage table in association with the retrieved address.

For example, when retrieving the address of the terminal 4-1 as an address identical with the extracted transmission destination address, the repeater according to the first embodiment updates the retrieval lapse time stored in the retrieval situation storage table in association with the address of the terminal 4-1 to "0".

Because of this, the repeater according to the first embodiment reduces a probability of overwriting a transmission source address on the address of a terminal having high frequency by which the terminal becomes a destination target of a frame and reduces a probability of executing a flooding process to decrease a surplus traffic. As a result, as described above as the main feature, the repeater can repeat a frame without degrading communication efficiency of a network.

Configuration of Repeater

Figure 2:
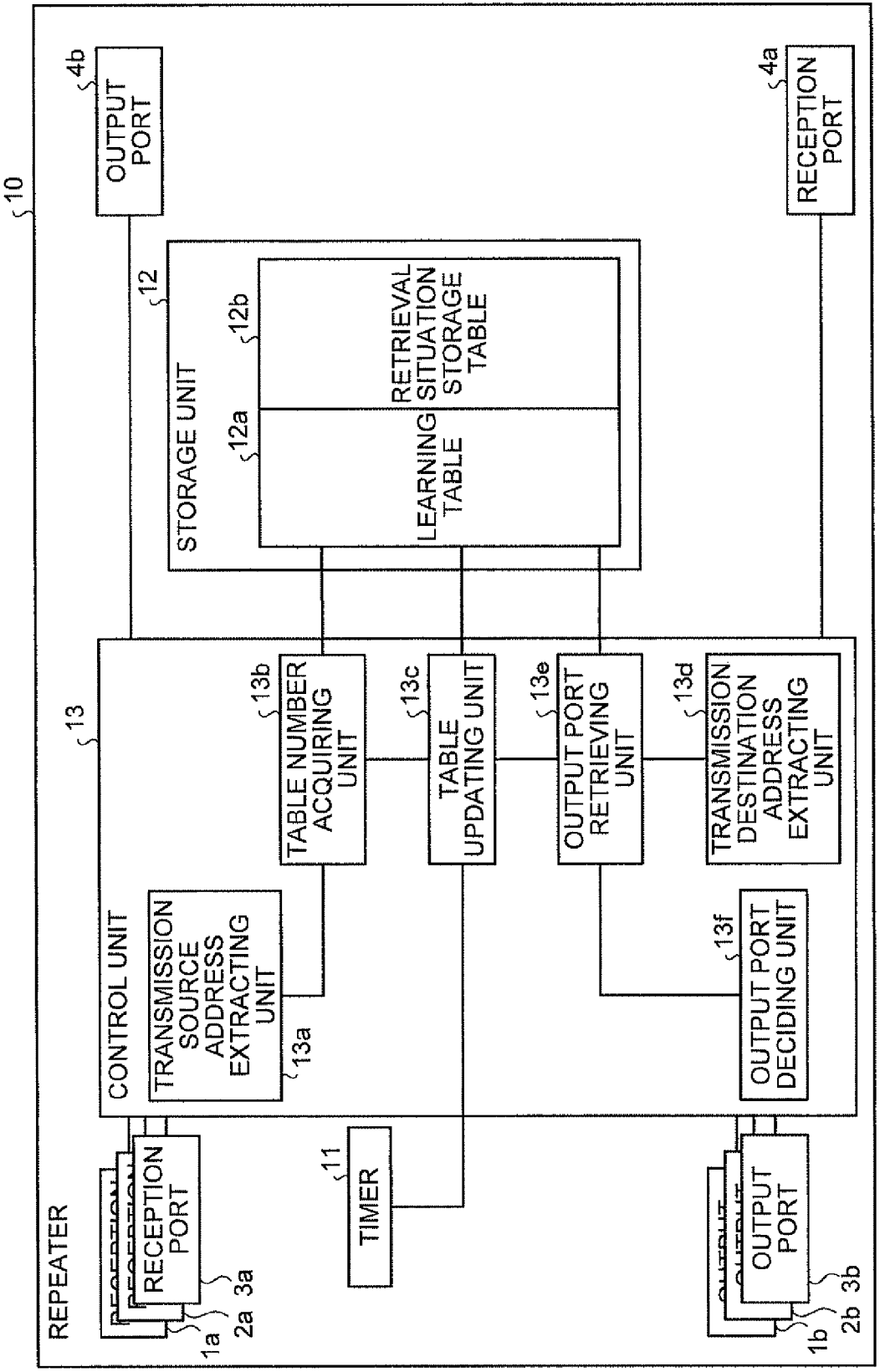
FIG. 2 is a block diagram of the repeater according to the first embodiment.

Next, it will be explained about the configuration of the repeater illustrated in FIG. 1 with reference to FIG. 2. FIG. 2 is a block diagram of a repeater 10 according to the first embodiment. FIG. 3 is a diagram illustrating an example of information registered in the learning table and the retrieval situation storage table according to the first embodiment.

As illustrated in FIG. 2, the repeater 10 includes reception ports 1a to 4a, output ports 1b to 4b, a timer 11, a storage unit 12, and a control unit 13.

Among them, the reception ports 1a to 4a receive data from a terminal device connected via a network. The output ports 1b to 4b output data to a terminal device connected via the network. In this case, the reception port 1a and the output port 1b correspond to the port number P1, the reception port 2a and the output port 2b correspond to a port number P2, the reception port 3a and the output port 3b correspond to a port number P3, and the reception port 4a and the output port 4b correspond to the port number P4.

The timer 11 corresponds to a clock or a self-timer that measures a time. Specifically, the timer 11 measures a time and informs the control unit 13 that a predetermined time has passed each time the predetermined time passes.

The storage unit 12 stores therein data and a program for various types of processes performed by the control unit 13. More particularly, data closely relevant to the present invention are a learning table 12a and a retrieval situation storage table 12b as illustrated in FIG. 2. The retrieval situation storage table 12b may also be referred to as "a retrieval situation storage unit".

The learning table 12a stores, each time a frame is received, the transmission source address of the reception frame in association with the reception port. Specifically, as illustrated in FIG. 3, the learning table 12a stores table numbers (for example, 1 to 100) for each port number (for example, P1) for receiving a frame, and stores an address (for example, the address of the terminal 1-1) identical with the transmission source address in association with each table number.

The retrieval situation storage table 12b stores the retrieval situation of an address retrieved as the address identical with the transmission destination address of the reception frame in association with each address registered in the learning table 12a. Specifically, as illustrated in FIG. 3, the retrieval situation storage table 12b stores a retrieval lapse time (for example, 1) that is a time for which an address is registered in the learning table 12a as a retrieval situation after the address is last retrieved in association with each address registered in the learning table 12a.

The control unit 13 includes an internal memory that stores therein control data and a program for defining various types of processing procedures, and executes various processes by using these. In particular, in regard to the present invention, the control unit 13 includes a transmission source address extracting unit 13a, a table number acquiring unit 13b, a table updating unit 13c, a transmission destination address extracting unit 13d, an output port retrieving unit 13e, and an output port deciding unit 13f. The table number acquiring unit 13b may also be referred to as "an address specifying unit", and the table updating unit 13c may also be referred to as "an address registering unit", "a retrieval situation updating unit", and "a retrieval lapse time updating unit".

The transmission source address extracting unit 13a extracts a transmission source address from a reception frame when receiving the frame. As a specific example, when receiving a frame transmitted from the terminal 1-101 to the terminal 4-1 via the port number P1, the transmission source address extracting unit 13a extracts the address of the terminal 1-101 that is a transmission source address from the reception frame.

When registering the transmission source address of the reception frame in the learning table 12a, the table number acquiring unit 13b refers to the retrieval situation of an address stored in association with the port number of a port identical with the reception port from retrieval situations stored in the retrieval situation storage table 12b as a retrieval lapse time, and specifies an address to be overwritten by the transmission source address of the reception frame.

Specifically, when the transmission source address extracting unit 13a extracts a transmission source address (for example, the address of the terminal 1-101) from the reception frame, the table number acquiring unit 13b refers to each address (for example, the addresses of the terminals 1-1 to 1-100) corresponding to a reception port (for example, P1) registered in the learning table 12a.

Then, when the address identical with the transmission source address is registered in association with the reception port, the table number acquiring unit 13b acquires a table number corresponding to the address identical with the transmission source address from the learning table 12a. For example, when the reception port of the reception frame is the port number P1 and the transmission source address of the frame is the address of the terminal 1-1, the table number acquiring unit 13b acquires a table number 1 from the learning table 12a in an example illustrated in FIG. 3.

Moreover, when the address identical with the transmission source address is not registered in the learning table 12a in association with the reception port, the table number acquiring unit 13b determines whether there is a vacant field among address registration fields corresponding to the reception port.

As the determination result, when it is determined that there is a vacant field among address registration fields corresponding to the reception port, the table number acquiring unit 13b acquires a table number corresponding to a vacant address registration field from the learning table 12a. For example, in an example illustrated in FIG. 3, when the port number of a port that receives a frame is P2, the table number acquiring unit 13b acquires a table number 102 from the learning table 12a.

Moreover, when it is determined that there is not a vacant field among address registration fields corresponding to the reception port, the table number acquiring unit 13b refers to the retrieval lapse time of an address stored in association with the reception port among retrieval lapse times stored in the retrieval situation storage table 12b, and specifies an address of which the retrieval lapse time is the longest as an overwriting address.

For example, when it is determined that there is not a vacant field among address registration fields corresponding to the port number P1, the table number acquiring unit 13b refers to a retrieval lapse time stored in the retrieval situation storage table 12b in association with each address (the addresses of the terminals 1-1 to 1-100 in an example illustrated in FIG. 3) corresponding to the port number P1, and specifies an address (the address of the terminal 1-2 in an example illustrated in FIG. 3) of which the retrieval lapse time is the longest as an overwriting address. Then, the table number acquiring unit 13b acquires the table number 2 corresponding to the address of the specified terminal 1-2.

When an address to be overwritten by the transmission source address of the reception frame is specified, the table updating unit 13c overwrites the transmission source address of the reception frame on the specified overwriting address to register the transmission source address.

Specifically, when the table number acquiring unit 13b acquires a table number corresponding to a vacant address registration field or acquires a table number corresponding to an address of which the retrieval lapse time is the longest, the table updating unit 13c overwrites the transmission source address on the learning table 12a and the retrieval lapse time "0" on the retrieval situation storage table 12b in association with the acquired table number to register the transmission source address and the retrieval lapse time.

Moreover, when the table number acquiring unit 13b acquires the table number for which an address identical with the transmission source address is registered, the table updating unit 13c re-registers the transmission source address in the learning table 12a in association with the acquired table number. In this case, re-registration means a process of overwriting an identical address on the learning table 12a to register the address.

Furthermore, when the address identical with the transmission destination address of the received frame is retrieved from the learning table 12a, the table updating unit 13c updates a retrieval situation stored in the retrieval situation storage table 12b in association with the retrieved address.

Specifically, when the table number acquiring unit 13b retrieves the address identical with the transmission destination address of the reception frame from the learning table 12a, the table updating unit 13c resets a retrieval lapse time stored in the retrieval situation storage table 12b in association with the retrieved address.

For example, when the table number acquiring unit 13b retrieves an address (for example, the address of the terminal 4-1) identical with the transmission destination address of the reception frame from the learning table 12a, the table updating unit 13c updates the retrieval lapse time stored in the retrieval situation storage table 12b to "0" in association with the retrieved address.

Moreover, the table updating unit 13c updates each retrieval lapse time stored in the retrieval situation storage table 12b each time a predetermined time passes. Specifically, the table updating unit 13c receives a notification indicating that a predetermined time has passed from the timer 11 each time the predetermined time passes, and adds "1" to each retrieval lapse time stored in the retrieval situation storage table 12b to update each retrieval lapse time.

When receiving a frame, the transmission destination address extracting unit 13d extracts the transmission destination address from the reception frame. As a specific example, when receiving a frame transmitted from the terminal 1-101 to the terminal 4-1 via the port number P1, the transmission destination address extracting unit 13d extracts the address of the terminal 4-1 that is a transmission destination address from the reception frame.

The output port retrieving unit 13e refers to all addresses registered in the learning table 12a and retrieves an address identical with the extracted transmission destination address. Specifically, when the transmission destination address extracting unit 13d extracts a transmission destination address, the output port retrieving unit 13e refers to all addresses registered in the learning table 12a and retrieves an address identical with the transmission destination address. Then, the output port retrieving unit 13e determines whether an address identical with the transmission destination address is registered in the learning table 12a.

The output port deciding unit 13f decides a port that repeats a frame and repeats the frame via the decided port. Specifically, when the output port retrieving unit 13e determines that the address identical with the transmission destination address is registered in the learning table 12a, the output port deciding unit 13f decides a port corresponding to the address identical with the transmission destination address as a port for repeating a frame and repeats the frame via the decided port.

On the other hand, when the output port retrieving unit 13e determines that the address identical with the transmission destination address is not registered in the learning table 12a, the output port deciding unit 13f copies the reception frame. Then, the output port deciding unit 13f decides all ports other than the reception port as a port for repeating a frame and repeats the frame via all ports other than the reception port.

Process by Repeater

Figure 4:
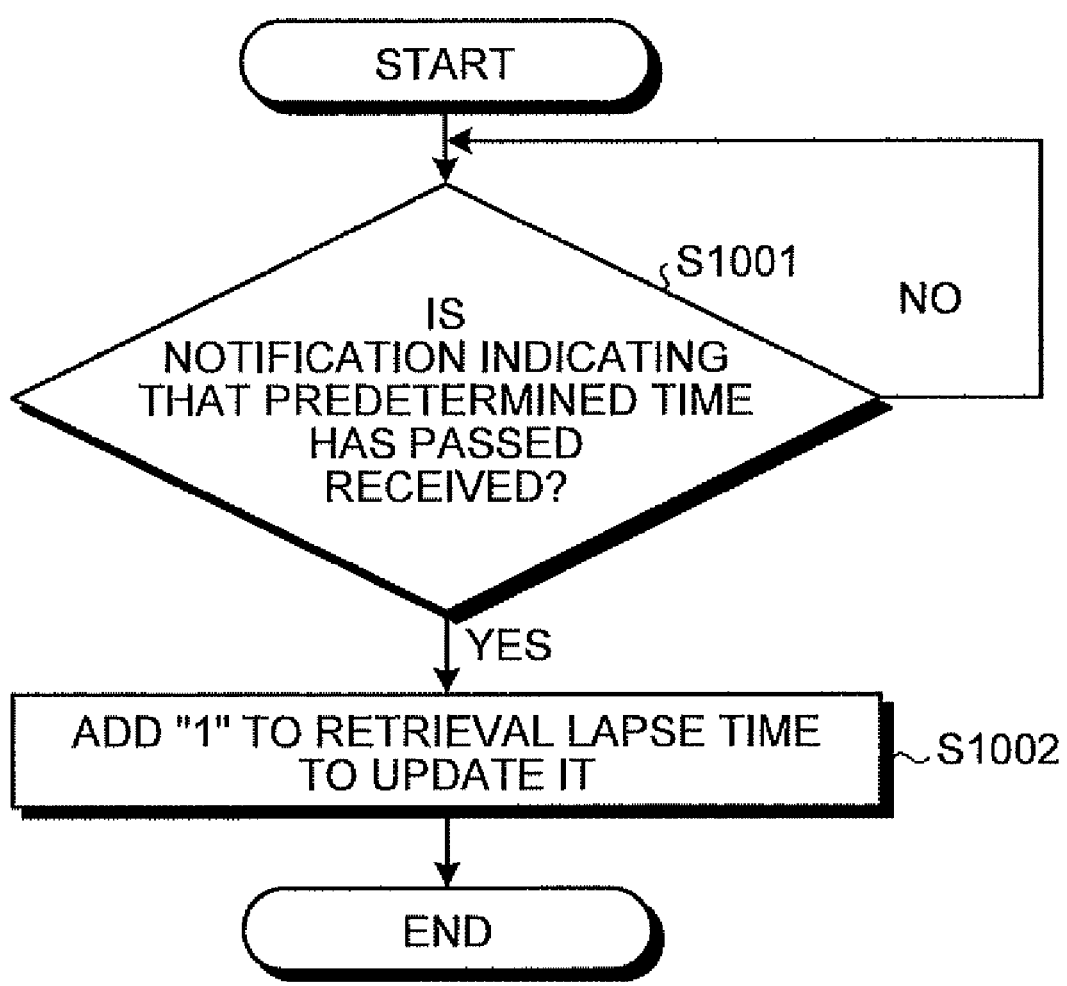
FIG. 4 is a flowchart illustrating the flow of a process performed when receiving a notification indicating that a predetermined time has passed.
Figure 5:
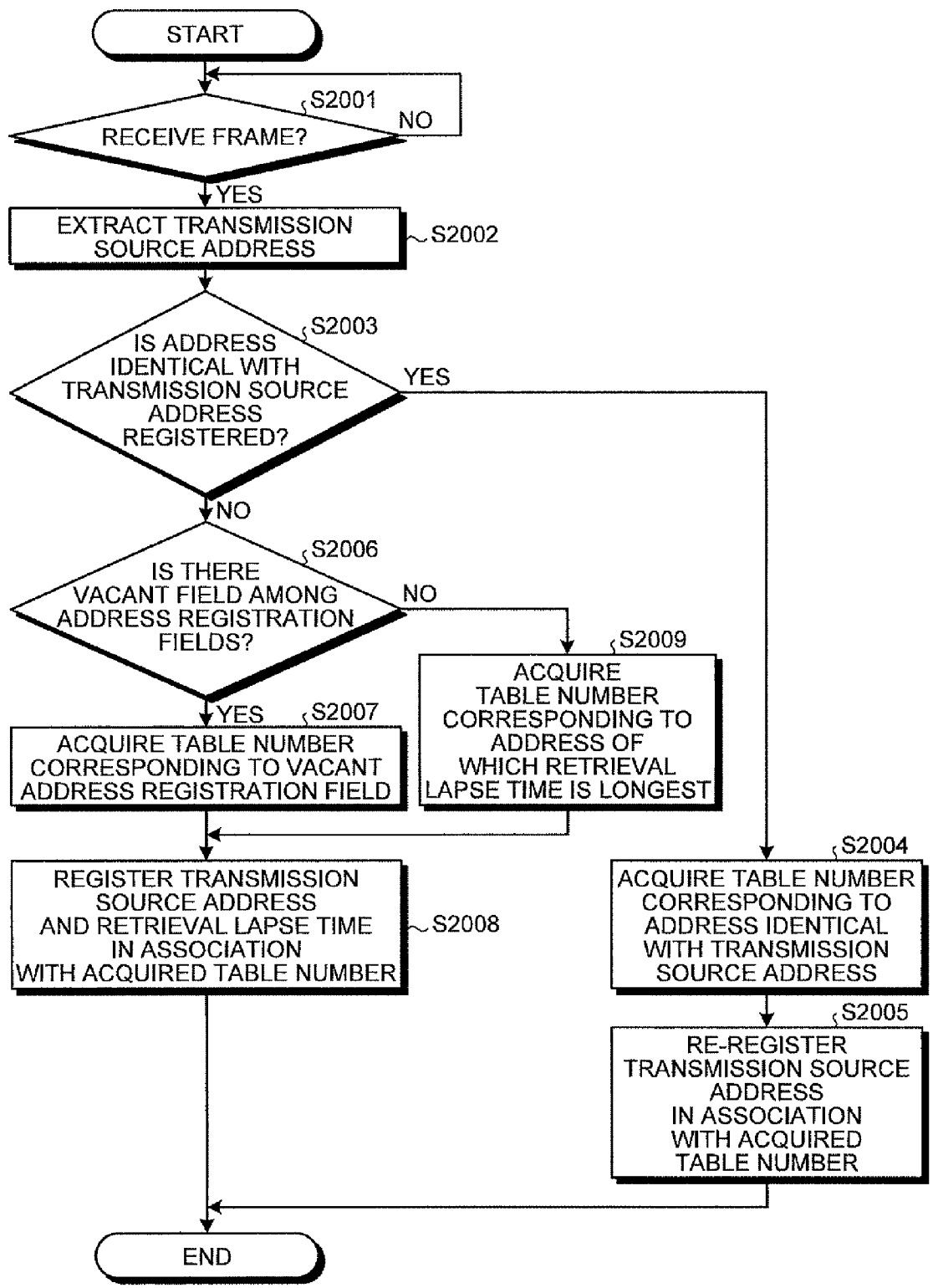
FIG. 5 is a flowchart illustrating the flow of a process for registering the transmission source address of a reception frame in the learning table.
Figure 6:
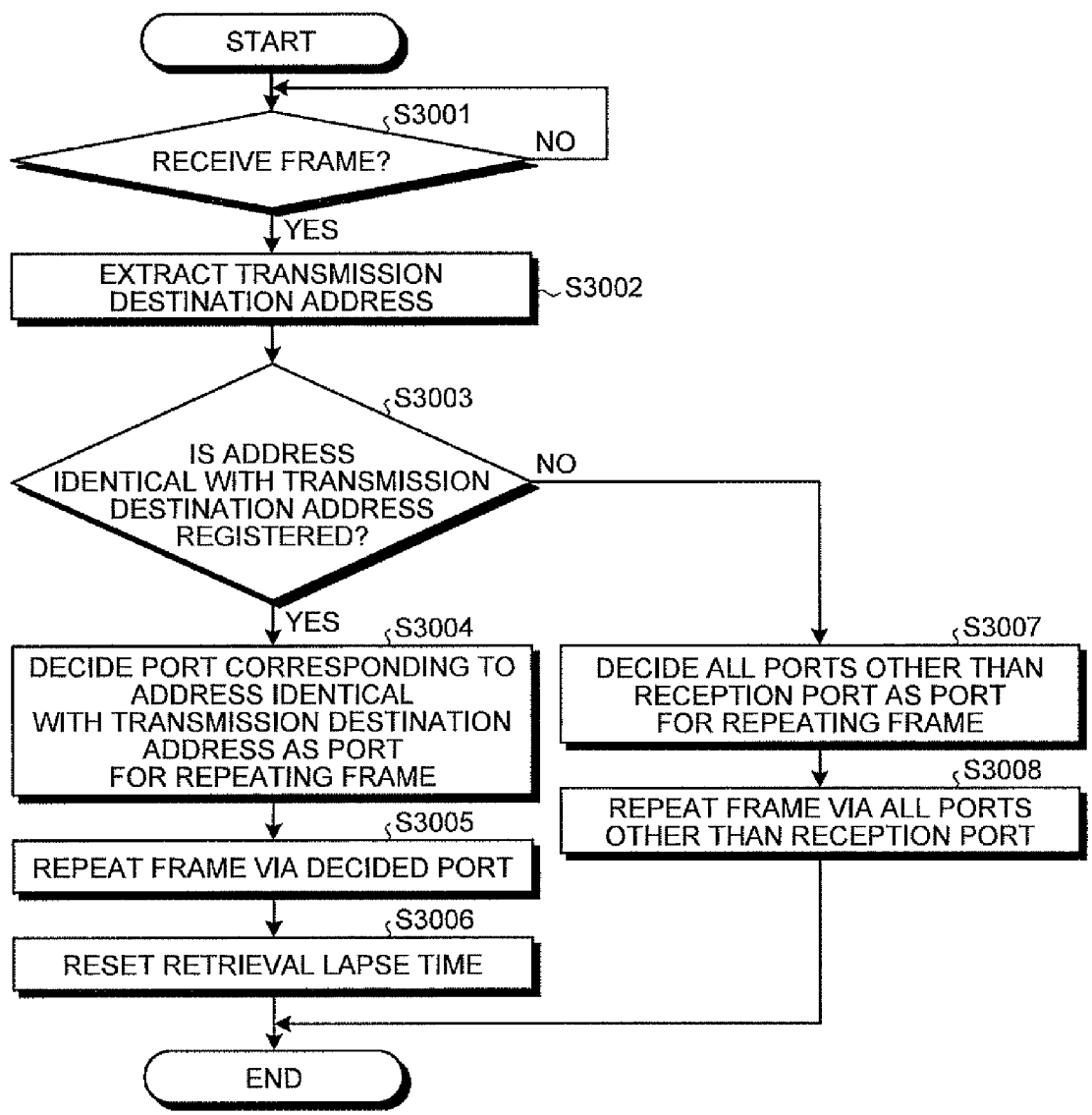
FIG. 6 is a flowchart illustrating the flow of a process for repeating the received frame.

Next, it will be explained about a process performed by the repeater with reference to FIGS. 4 to 6. FIG. 4 is a flowchart illustrating the flow of a process performed when receiving a notification indicating that a predetermined time has passed. FIG. 5 is a flowchart illustrating the flow of a process of registering the transmission source address of the reception frame in the learning table. FIG. 6 is a flowchart illustrating the flow of a process of repeating the received frame.

Process when Receiving Effect that Predetermined Time has Passed

As illustrated in FIG. 4, when receiving the notification indicating that a predetermined time has passed via the timer 11 (Step S1001: YES), the table updating unit 13c adds "1" to each retrieval lapse time stored in the retrieval situation storage table 12b to update each retrieval lapse time (Step S1002), terminates the process, and waits until the predetermined time passes again (Step S1001).

Process of Registering Transmission Source Address of Reception Frame in Learning Table As illustrated in FIG. 5, when receiving a frame (Step S2001: YES), the transmission source address extracting unit 13a extracts a transmission source address from the reception frame (Step S2002).

Next, the table number acquiring unit 13b refers to each address corresponding to the reception port registered in the learning table 12a (Step S2003).

In this case, when an address identical with the transmission source address is registered in association with the reception port (Step S2003: YES), the table number acquiring unit 13b acquires a table number corresponding to the address identical with the transmission source address from the learning table 12a (Step S2004).

Next, the table updating unit 13c re-registers the transmission source address in the learning table 12a in association with the acquired table number (Step S2005), and terminates the process. The transmission source address extracting unit 13a again waits to receive a frame (Step S2001).

On the other hand, when the address identical with the transmission source address is not registered in the learning table 12a in association with the reception port (Step S2003: NO), the table number acquiring unit 13b determines whether there is a vacant field among address registration fields corresponding to the reception port (Step S2006).

In this case, when it is determined that there is a vacant field among address registration fields corresponding to the reception port (Step S2006: YES), the table number acquiring unit 13b acquires a table number corresponding to the vacant address registration field from the learning table 12a (Step S2007).

Next, the table updating unit 13c overwrites the transmission source address on the learning table 12a and the retrieval lapse time "0" on the retrieval situation storage table 12b in association with the acquired table number to register the transmission source address and the retrieval lapse time "0" (Step S2008), and terminates the process. The transmission source address extracting unit 13a again waits to receive a frame (Step S2001).

On the other hand, when it is determined that there is not a vacant field among address registration fields corresponding to the reception port (Step S2006: NO), the table number acquiring unit 13b refers to the retrieval lapse time of the address stored in association with the reception port among retrieval lapse times stored in the retrieval situation storage table 12b, specifies an address of which the retrieval lapse time is the longest as an overwriting address, and acquires a table number corresponding to the specified address (Step S2009).

Next, the table updating unit 13c overwrites the transmission source address on the learning table 12a and the retrieval lapse time "0" on the retrieval situation storage table 12b in association with the acquired table number to register the transmission source address and the retrieval lapse time "0" (Step S2008), and terminates the process. The transmission source address extracting unit 13a again waits to receive a frame (Step S2001).

Process of Repeating Received Frame

As illustrated in FIG. 6, when receiving a frame (Step S3001: YES), the transmission destination address extracting unit 13d extracts a transmission destination address from the reception frame (Step S3002).

Next, the output port retrieving unit 13e refers to all addresses registered in the learning table 12a, retrieves an address identical with the transmission destination address, and determines whether the address identical with the transmission destination address is registered in the learning table 12a (Step S3003).

In this case, when it is determined that the address identical with the transmission destination address is registered in the learning table 12a (Step S3003: YES), the output port deciding unit 13f decides a port corresponding to the address identical with the transmission destination address as a port for repeating a frame (Step S3004), and repeats the frame via the decided port (Step S3005).

Next, the table updating unit 13c resets the retrieval lapse time stored in the retrieval situation storage table 12b in association with the retrieved address (Step S3006), and terminates the process. The transmission source address extracting unit 13a again waits to receive a frame (Step S3001).

On the other hand, when it is determined that the address identical with the transmission destination address is not registered (Step S3003: NO), the output port deciding unit 13f copies the frame, decides all ports other than the reception port as a port for repeating a frame (Step S3007), repeats the frame via all ports other than the reception port (Step S3008), and terminates the process. The transmission source address extracting unit 13a again waits to receive a frame (Step S3001).

Effect by First Embodiment

As described above, according to the first embodiment, the repeater stores the retrieval situation of the address retrieved as an address identical with a transmission destination address of a reception frame in association with each address registered in the learning table, refers to, when registering the transmission source address of the received frame in the learning table, the retrieval situation of the address stored in association with a port identical with the port that receives a frame from retrieval situations stored in the retrieval situation storage table 12b, specifies an address to be overwritten by the transmission source address of the reception frame, overwrites the transmission source address of the reception frame on the specified overwriting address to register the transmission source address, and updates, when retrieving an address identical with the transmission destination address of the received frame from the learning table 12a, the retrieval situation stored in the retrieval situation storage table 12b in association with the retrieved address. Therefore, a probability of overwriting a transmission source address on the address of a terminal that becomes the transmission target of the reception frame at high frequency is reduced and a probability of executing a flooding process is reduced to decrease a surplus traffic. As a result, the repeater can repeat a frame without degrading communication efficiency of a network.

Moreover, according to the first embodiment, the repeater stores a retrieval lapse time that is a lapse time passed after an address registered in the learning table 12a is last retrieved, as a retrieval situation in association with each address, updates each retrieval lapse time each time a predetermined time passes, refers to, when registering the transmission source address of the received frame in the learning table 12a, the retrieval lapse time of the address stored in association with a port identical with the port that receives a frame among retrieval lapse times stored in the retrieval situation storage table 12b, specifies an address of which the retrieval lapse time is the longest as an overwriting address, and resets, when retrieving the address identical with the transmission destination address of the received frame from the learning table 12a, the retrieval lapse time stored in the retrieval situation storage table 12b in association with the retrieved address. Therefore, the repeater can register the address of a terminal having a short lapse time after becoming the transmission target of the frame in the learning table, and thus a probability of executing a flooding process is reduced to decrease a surplus traffic. As a result, the repeater can repeat a frame without degrading communication efficiency of a network.

[b] Second Embodiment

In the first embodiment, it has been explained about the case where a retrieval lapse time is stored as a retrieval situation in association with each address. However, the present invention is not limited to this. The repeater can store the number of address retrievals as a retrieval situation. Therefore, in the following second embodiment, the configuration of a repeater according to the second embodiment is explained and then an effect by the second embodiment is explained.

Configuration of Repeater

Figure 7:
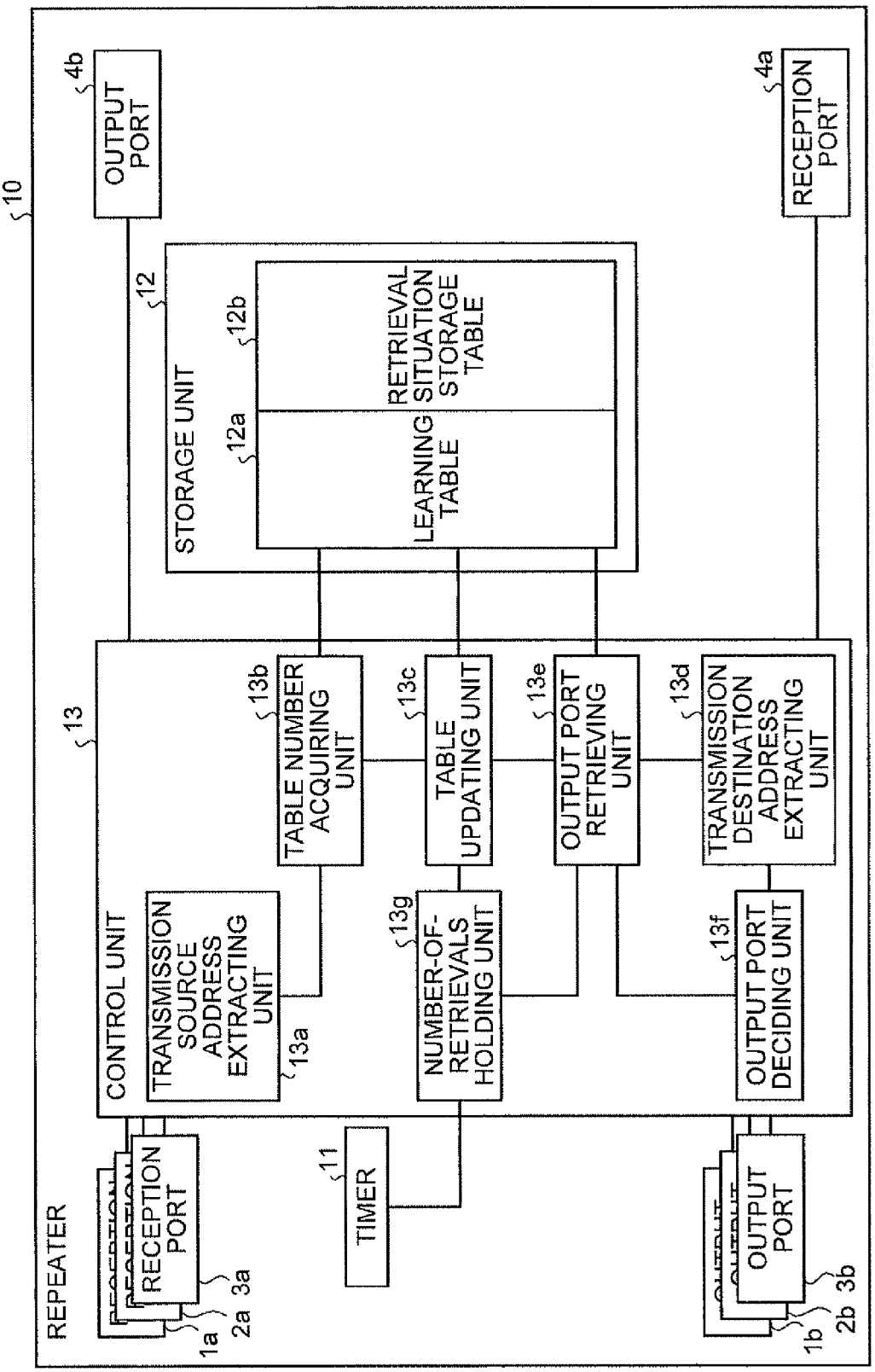
FIG. 7 is a block diagram of a repeater according to a second embodiment.

It will be explained about the configuration of the repeater according to the second embodiment with reference to FIGS. 7 to 9. FIG. 7 is a block diagram of the repeater according to the second embodiment. FIG. 8 is a diagram illustrating an example of information registered in a learning table and a retrieval situation storage table according to the second embodiment. FIG. 9 is a diagram illustrating an example of information held in a number-of-retrievals holding unit. The repeater according to the second embodiment has the basically same configuration as the repeater 10 according to the first embodiment except the following points.

As illustrated in FIG. 8, the retrieval situation storage table 12b stores the number of retrievals (for example, 7) of an address registered in the learning table 12a as a retrieval situation in association with each address stored in the learning table 12a.

A number-of-retrievals holding unit 13g counts and holds the number of retrievals of each address registered in the learning table 12a. Specifically, as illustrated in FIG. 9, the number-of-retrievals holding unit 13g holds the number of counts (for example, 7) of each address registered in the learning table 12a in association with a table number.

Moreover, when the output port retrieving unit 13e retrieves an address identical with a transmission destination address, the number-of-retrievals holding unit 13g accepts a table number corresponding to the address identical with the transmission destination address from the output port retrieving unit 13e, and adds "1" to the number of counts corresponding to the accepted table number to update the number of counts.

Then, when receiving a notification indicating that a predetermined time has passed from the timer 11, the number-of-retrievals holding unit 13g informs the table updating unit 13c of the number of counts corresponding to each table number and updates the number of counts to "0". The number-of-retrievals holding unit 13g may also be referred to as "a number-of-retrievals holding unit".

When it is determined that there is not a vacant field among address registration fields corresponding to the reception port, the table number acquiring unit 13b refers to the number of retrievals of an address stored in association with a port number of the port identical with the reception port among the numbers of retrievals stored in the retrieval situation storage table 12b, and specifies an address of which the number of retrievals is smallest as an overwriting address.

For example, when it is determined that there is not a vacant field among address registration fields corresponding to the port number P1, the table number acquiring unit 13b refers to the number of retrievals registered in the retrieval situation storage table 12b in association with each address (in an example illustrated in FIG. 8, the addresses of the terminals 1-1 to 1-100) corresponding to the port number P1, and specifies an address (in an example illustrated in FIG. 8, the address of the terminal 1-2) of which the number of retrievals is smallest as an overwriting address. Then, the table number acquiring unit 13b acquires a table number corresponding to the specified address.

When the table number acquiring unit 13b acquires a table number corresponding to the vacant address registration field or acquires a table number corresponding to the address of which the number of retrievals is smallest, the table updating unit 13c overwrites the transmission source address on the learning table 12a and the number of retrievals "0" on the retrieval situation storage table 12b to register the transmission source address and the number of retrievals "0" in association with the acquired table number.

Moreover, the table updating unit 13c updates the number of retrievals stored in the retrieval situation storage table 12b to the number of retrievals held in the number-of-retrievals holding unit 13g. Specifically, when accepting the number of counts corresponding to each table number from the number-of-retrievals holding unit 13g, the table updating unit 13c updates the number of retrievals stored in the retrieval situation storage table 12b to the accepted number of counts.

Effect by Second Embodiment

As described above, according to the second embodiment, the repeater stores the number of retrievals of the address registered in the learning table 12a as a retrieval situation in association with each address, counts and holds the number of retrievals of each address registered in the learning table 12a, refers to, when registering the transmission source address of the received frame in the learning table 12a, the number of retrievals of the address stored in association with a port identical with the port that receives a frame among the numbers of retrievals stored in the retrieval situation storage table 12b, specifies an address of which the number of retrievals is smallest as an overwriting address, and updates the number of retrievals stored in the retrieval situation storage table 12b to the number of retrievals held in the number-of-retrievals holding unit 13g. Therefore, the repeater can register the address of a terminal that becomes the transmission target of the frame at high frequency in the learning table, and thus a probability of executing a flooding process is reduced to decrease a surplus traffic. As a result, the repeater can repeat a frame without degrading communication efficiency of a network.

[c] Third Embodiment

In the second embodiment, the number of retrievals of an address is stored in the retrieval situation storage table 12b as a retrieval situation, and the number of retrievals stored in the retrieval situation storage table 12b is updated to the number of retrievals counted by the number-of-retrievals holding unit 13g. However, the present invention is not limited to this. The repeater can store a retrieval situation parameter in the retrieval situation storage table 12b as a retrieval situation, compute a new retrieval situation parameter by using the retrieval situation parameter stored in the retrieval situation storage table 12b and the number of retrievals counted by the number-of-retrievals holding unit 13g, and update the retrieval situation parameter stored in the retrieval situation storage table 12b. Therefore, in the following third embodiment, the configuration of a repeater according to the third embodiment is explained and then an effect by the third embodiment is explained.

Configuration of Repeater

Figure 10:
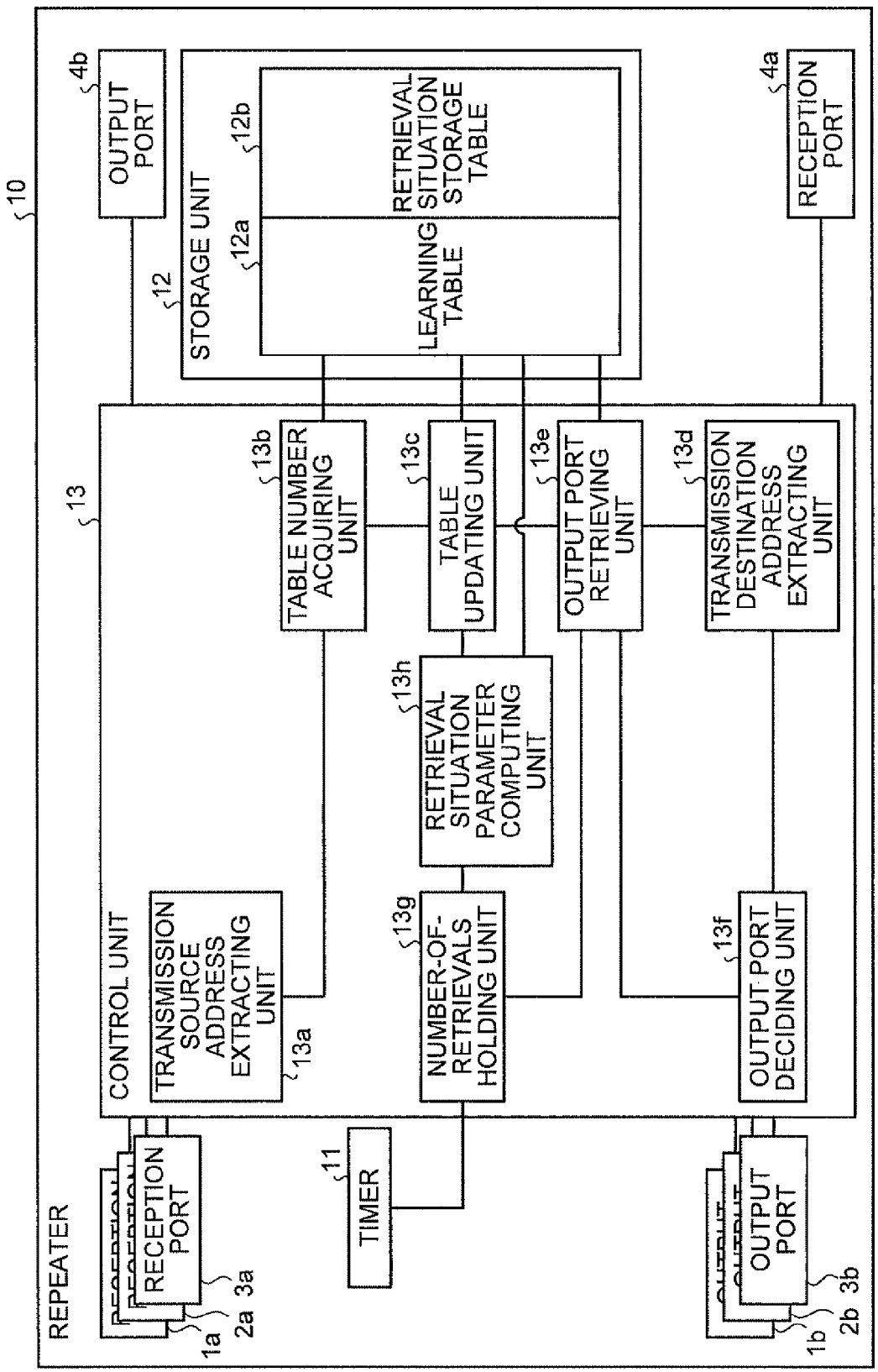
FIG. 10 is a block diagram of a repeater according to a third embodiment.

It will be explained about the configuration of the repeater according to the third embodiment with reference to FIG. 10. FIG. 10 is a block diagram of the repeater according to the third embodiment. The repeater according to the third embodiment has the basically same configuration as the repeater 10 according to the second embodiment except the following points.

The retrieval situation storage table 12b stores a retrieval situation parameter indicative of the retrieval situation of an address stored in the learning table 12a in association with each address. The retrieval situation parameter is a numeric value indicative of the number of retrievals of each address. When a retrieval situation parameter is high, the number of retrievals of the corresponding address is large. When a retrieval situation parameter is low, the number of retrievals of the corresponding address is small.

When accepting a notification indicating that a predetermined time has passed from the timer 11, the number-of-retrievals holding unit 13g informs a retrieval situation parameter computing unit 13h of the number of counts corresponding to each table number and updates the number of counts to "0".

The retrieval situation parameter computing unit 13h multiplies an arbitrarily given first ratio by the retrieval situation parameter stored in the retrieval situation storage table 12b to compute a first multiplication value, multiplies an arbitrarily given second ratio by the number of retrievals counted and held by the number-of-retrievals holding unit 13g to compute a second multiplication value, and adds the first multiplication value to the second multiplication value to compute a new retrieval situation parameter.

For example, when accepting the number of counts from the number-of-retrievals holding unit 13g, the retrieval situation parameter computing unit 13h reads each retrieval situation parameter from the retrieval situation storage table 12b. Then, the retrieval situation parameter computing unit 13h assigns the read retrieval situation parameter (R1) and the accepted count result (N1) to the following computation expression (A) to compute a new retrieval situation parameter. Furthermore, the retrieval situation parameter computing unit 13h informs the table updating unit 13c of the computation result. In this case, W1 is the arbitrarily given first ratio and W2 is the arbitrarily given second ratio. The retrieval situation parameter computing unit 13h may also be referred to as "a retrieval situation parameter computing unit". The computation expression (A) is "W1×R1+W2×N1".

When it is determined that there is not a vacant field among address registration fields corresponding to the reception port, the table number acquiring unit 13b refers to the retrieval situation parameter of the address stored in association with the port number of the port identical with the reception port among retrieval situation parameters stored in the retrieval situation storage table 12b, and specifies an address of which the numeric value of the retrieval situation parameter is the lowest as an overwriting address.

For example, when it is determined that there is not a vacant field among address registration fields corresponding to the port number P1, the table number acquiring unit 13b refers to the number of retrievals registered in the retrieval situation storage table 12b in association with each address corresponding to the port number P1, specifies an address of which the numeric value of the retrieval situation parameter is the lowest as an overwriting address, and acquires a table number corresponding to the specified address.

When a table number corresponding to the vacant address registration field is acquired, the table updating unit 13c overwrites the transmission source address on the learning table 12a and the numeric value "0" of the retrieval situation parameter on the retrieval situation storage table 12b in association with the acquired table number to register the transmission source address and the numeric value "0" of the retrieval situation parameter.

The table updating unit 13c further updates the retrieval situation parameter stored in the retrieval situation storage table 12b to the new retrieval situation parameter computed by the retrieval situation parameter computing unit 13h. Specifically, when accepting the computation result from the retrieval situation parameter computing unit 13h, the table updating unit 13c updates the number of retrievals stored in the retrieval situation storage table 12b to the accepted computation result.

Effect by Third Embodiment

As described above, according to the third embodiment, when giving a ratio heavier than the second ratio to the first ratio, a retrieval situation parameter can be updated so that an influence caused by the number of retrievals measured for a predetermined time becomes strong. Therefore, the repeater can register in the learning table the address of a terminal that recently becomes the transmission target of the frame at high frequency from among the addresses of a terminal that becomes the transmission target of the frame at high frequency, and thus a probability of executing a flooding process is reduced to decrease a surplus traffic. As a result, the repeater can repeat a frame without degrading communication efficiency of a network.

[d] Fourth Embodiment

In the first to third embodiments, the repeater specifies an address to be overwritten by a transmission source address of a reception frame based on only the retrieval situation of each address. However, the present invention is not limited to this. The repeater can specify an address to be overwritten by a transmission source address of a reception frame based on the retrieval situation of each address and a registration lapse time that is a lapse time for which each address is held after each address is last registered. In the following fourth embodiment, the configuration of the repeater according to the fourth embodiment is explained and then an effect by the fourth embodiment is explained. In addition, in the fourth embodiment, it will be explained about the case where a retrieval lapse time is stored in the retrieval situation storage table 12b and an address to be overwritten by a transmission source address of a reception frame is specified based on a retrieval lapse time and a registration lapse time.

Configuration of Repeater

Figure 11:
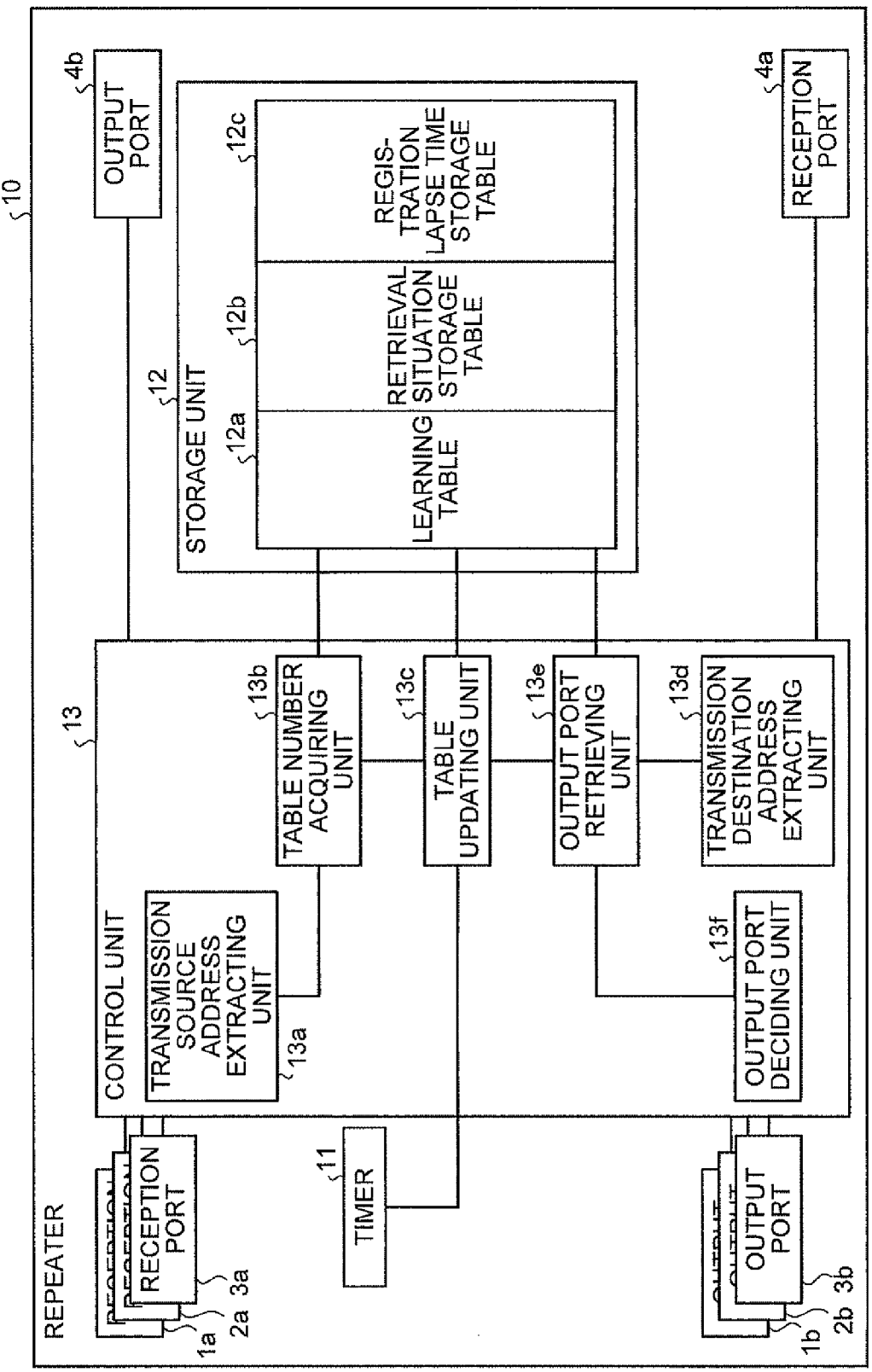
FIG. 11 is a block diagram of a repeater according to a fourth embodiment.

It will be explained about the configuration of the repeater according to the fourth embodiment with reference to FIGS. 11 and 12. FIG. 11 is a block diagram of the repeater according to the fourth embodiment. FIG. 12 is a diagram illustrating an example of information registered in the learning table, the retrieval situation storage table, and the registration lapse time storage table according to the fourth embodiment. The repeater according to the fourth embodiment has the basically same configuration as the repeater 10 according to the first embodiment except the following points.

A registration lapse time storage table 12c stores a registration lapse time that is a lapse time for which each address is held after each address is last registered in the learning table in association with each address registered in the learning table.

Specifically, as illustrated in FIG. 11, the registration lapse time storage table 12c stores a registration lapse time (for example, 10) that is a lapse time for which each address is held after each address is last registered in the learning table 12a in association with each address registered in the learning table 12a. The registration lapse time storage table 12c may also be referred to as "a registration lapse time storage unit".

The table updating unit 13c updates each registration lapse time stored in the registration lapse time storage table 12c each time a predetermined time passes. Specifically, each time a predetermined time passes, the table updating unit 13c accepts a notification indicating that the predetermined time has passed from the timer 11 and adds "1" to each retrieval lapse time stored in the registration lapse time storage table 12c to update each retrieval lapse time. The unit of a registration lapse time (for example, 1) is time. For example, the unit indicates "second" or "minute" that is previously defined as a predetermined time. The table updating unit 13c may also be referred to as "a registration lapse time updating unit".

When the transmission source address of the received frame is registered in the learning table 12a, the table number acquiring unit 13b multiplies an arbitrarily given third ratio by the registration lapse time of each address stored in association with a port identical with the port that receives a frame in the registration lapse time storage table 12c to compute a plurality of third multiplication values, multiplies an arbitrarily given fourth ratio by the retrieval situation of each address stored in association with a port identical with the port that receives the frame among retrieval situations of each address stored in the retrieval situation storage table 12b to compute a plurality of fourth multiplication values, adds the third multiplication value to the fourth multiplication value for each address stored in the retrieval situation storage table 12b in association with the port identical with the port that receives the frame, and specifies an address of which the added value is the lowest as an overwriting address.

Specifically, when it is determined that there is not a vacant field among address registration fields corresponding to the reception port, the table number acquiring unit 13b reads a registration lapse time (T1) from the registration lapse time storage table 12c and reads a retrieval lapse time (T2) from the retrieval situation storage table 12b. Then, the table number acquiring unit 13b specifies as an overwriting address an address of which the computation result obtained by assigning the read registration lapse time (T1) and retrieval lapse time (T2) to the following computation expression (B) is the lowest. Then, the table number acquiring unit 13b acquires a table number corresponding to the address of which the specified computation result is the lowest. The computation expression (B) is "W3×T1+W4×T2", where, W3 is the arbitrarily given third ratio and W4 is the arbitrarily given fourth ratio.

Effect by Fourth Embodiment

As described above, according to the fourth embodiment, the repeater stores a registration lapse time that is a lapse time for which each address is held after each address is last registered in the learning table 12a in association with each address registered in the learning table 12a, updates each registration lapse time stored in the registration lapse time storage table 12c each time a predetermined time passes, multiplies, when the transmission source address of the received frame is registered in the learning table 12a, the arbitrarily given third ratio by the registration lapse time of each address stored in association with a port identical with the port that receives a frame in the registration lapse time storage table 12c to compute the plurality of third multiplication values, multiplies the arbitrarily given fourth ratio by the retrieval situation of each address stored in association with the port identical with the port that receives the frame from among retrieval situations of each address stored in the retrieval situation storage table 12b to compute the plurality of fourth multiplication values, and adds the third multiplication value to the fourth multiplication value for each address stored in association with the port identical with the port that receives the frame in the retrieval situation storage table 12b, and specifies an address of which the added value is the lowest as an overwriting address. Therefore, the address of a terminal that becomes the transmission target of a frame at low frequency can also be registered in the learning table based on the fact that time elapsed since its registration is short and thus a probability of executing a flooding process is reduced to decrease a surplus traffic. As a result, the repeater can repeat a frame without degrading communication efficiency of a network.

In addition, the repeater can not only specify an address to be overwritten by the transmission source address of the reception frame based on the registration lapse time stored in the registration lapse time storage table 12c and the retrieval lapse time stored in the table number acquiring unit 13b, but also specify, as an address to be overwritten by the transmission source address of the reception frame, an address of which the computation result obtained by assigning the registration lapse time (T1) stored in the registration lapse time storage table 12c and the number of retrievals (N1) stored in the table number acquiring unit 13b to the following computation expression (C) is the largest. The computation expression (C) is "W3×T1−W4×N1".

Moreover, the repeater can specify, as an address to be overwritten by the transmission source address of the reception frame, an address of which the computation result obtained by assigning the registration lapse time (T1) stored in the registration lapse time storage table 12c and the retrieval situation parameter (R1) stored in the table number acquiring unit 13b to the following computation expression (D) is largest. The computation expression (D) is "W3×T1−W4×R1".

In the computation expression (C) "W3×T1−W4×N1", a ratio defined by the number of times/amount of time is assigned to the third ratio (W3) so that the unit of computation result corresponds to the unit of the number of times, for example. In this way, a ratio assigned to the third ratio (W3) and the fourth ratio (W4) has such a unit that the unit of the computation result corresponds to the unit of the number of times/amount of time.

[e] Fifth Embodiment

As described above, it has been explained about the first to fourth embodiments. The present invention can be realized by various different configurations in addition to the embodiments described above. Therefore, another embodiment will be below explained as the fifth embodiment.

For example, in the first to fourth embodiments, it has been explained that when an address identical with a transmission source address is already registered, a table number for which the address identical with the transmission source address is registered is acquired. However, the present invention is not limited to this. For example, the repeater can further determine whether a port number corresponding to an address identical with a transmission source address is the same as that of the reception port. When the port number corresponding to the address identical with the transmission source address is the same as the reception port, the repeater may acquire a table number for which the address identical with the transmission source address is registered; when the port number corresponding to the address identical with the transmission source address is not the same as the reception port the repeater may determine whether there is a vacant field among address registration fields corresponding to the port number of the port that receives a frame.

Moreover, in the first to fourth embodiments, it has been explained about the case where the output port deciding unit 13f decides a port corresponding to an address identical with a transmission destination address as a port that repeats a frame when the output port retrieving unit 13e determines that the address identical with the transmission destination address is registered. However, the present invention is not limited to this. For example, the repeater can further determine whether a port number corresponding to the address identical with the transmission destination address is identical with that of the reception port. On determining that the port number corresponding to the address identical with the transmission destination address is identical with that of the reception port, the repeater may discards a frame; on determining that the port number corresponding to the address identical with the transmission destination address is not identical with that of the reception port, the repeater may decide a port corresponding to the address identical with the transmission destination address as a port that repeats the frame.

When discarding the frame, the repeater can update a retrieval situation corresponding to the address identical with the transmission destination address.

System Configuration

Information (for example, storage information illustrated in FIGS. 1, 3, 8, 9, and 12) including processing procedures, control procedures, specific names, various types of data and parameters that are described above and drawings in connection with the description of the processes of the embodiments can be arbitrarily modified if not otherwise specified.

Each component of each device illustrated in the drawings is a functional concept. Therefore, these components are not necessarily constituted physically as illustrated in the drawings. In other words, the specific configuration of dispersion/integration of each device is not limited to the illustrated configuration. Therefore, all or a part of each device can dispersed or integrated functionally or physically in an optional unit in accordance with various types of loads or operating conditions. For example, in FIG. 2, the learning table 12a can be integrated into the retrieval situation storage table 12b. Furthermore, all or a part of each process function performed by each device can be realized by CPU and a program that is analyzed and executed by the CPU or can be realized by a hardware by wired logic.

Repeating Program

Figure 13:
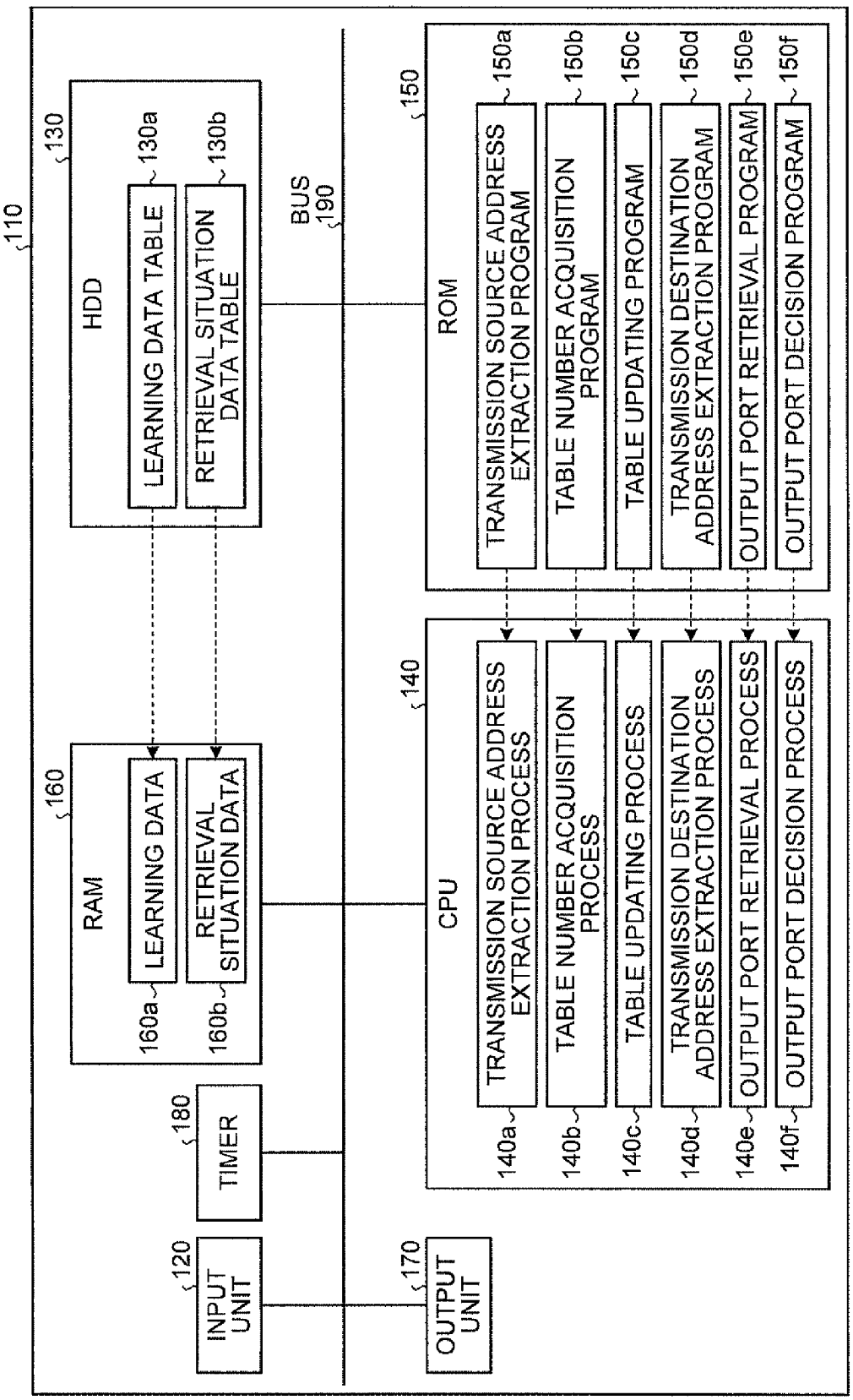
FIG. 13 is a diagram of a computer for executing a repeating program.

In the embodiments, it has been explained about the case where various types of processes are realized by hardware logic. However, the present invention is not limited to this. Various types of processes can be realized by executing a previously-prepared program by using a computer. Hereinafter, it will be explained about an example of a computer that executes a repeating program having a function similar to that of the repeater described in the embodiments with reference to FIG. 13. FIG. 13 is a diagram illustrating a computer 110 that executes a repeating program.

As illustrated in FIG. 13, the computer 110 that functions as a repeater includes an input unit 120, a Hard Disk Drive (HDD) 130, a Central Processing Unit (CPU) 140, a Read-only Memory (ROM) 150, a Random Access Memory (RAM) 160, an output unit 170, and a timer 180 that are connected by a bus 190.

The ROM 150 stores a repeating program having a function similar to that of the repeater 10 illustrated in the first embodiment. The repeating program includes a transmission source address extraction program 150a, a table number acquisition program 150b, a table updating program 150c, a transmission destination address extraction program 150d, an output port retrieval program 150e, and an output port decision program 150f as illustrated in FIG. 13. In addition, these programs 150a to 150f can be appropriately integrated or dispersed similarly to the units of the repeater 10 illustrated in FIG. 2.

Because the CPU 140 reads these programs 150a to 150f from the ROM 150 and executes these programs, the programs 150a to 150f function as a transmission source address extraction process 140a, a table number acquisition process 140b, a table updating process 140c, a transmission destination address extraction process 140d, an output port retrieval process 140e, and an output port decision process 140f as illustrated in FIG. 13. In addition, the processes 140a to 140f respectively correspond to the transmission source address extracting unit 13a, the table number acquiring unit 13b, the table updating unit 13c, the transmission destination address extracting unit 13d, the output port retrieving unit 13e, and the output port deciding unit 13f as illustrated in FIG. 2.

As illustrated in FIG. 13, the HDD 130 includes a learning data table 130a and a retrieval situation data table 130b. In addition, the learning data table 130a and the retrieval situation data table 130b respectively correspond to the learning table 12a and the retrieval situation storage table 12b as illustrated in FIG. 2. The CPU 140 reads learning data 160a and retrieval situation data 160b from the learning data table 130a and the retrieval situation data table 130b and stores the data in the RAM 160. Then, the CPU 140 executes processes on the basis of the learning data 160a and the retrieval situation data 160b stored in the RAM 160.

The programs 150a to 150f may not be stored in the ROM 150 from the start. For example, each program can be stored in "a portable physical medium" such as a flexible disk (FD), a CD-ROM, a digital versatile disk (DVD), a magneto-optical disk, or an IC card that is inserted into the computer 110, "a fixed physical medium" such as an HDD that is provided inside and outside the computer 110, or "another computer (or server)" that is connected to the computer 110 via a public line, Internet, LAN, WAN, and the like. The computer 110 can read each program from these media and execute each program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A repeater comprising: a learning table for registering, each time a reception frame is received, a transmission source address of the reception frame in association with a reception port; a control unit that retrieves an address identical with a transmission destination address of the reception frame from the learning table to repeat the reception frame via a port corresponding to the retrieved address; a retrieval situation storage unit that stores a retrieval situation of an address retrieved as the address identical with the transmission destination address of the reception frame in association with each address registered in the learning table; an address specifying unit that refers to, when registering the transmission source address of the received frame in the learning table, a retrieval situation of an address stored in association with a port identical with a port that receives the frame among retrieval situations stored in the retrieval situation storage unit and specifies an address to be overwritten by the transmission source address of the reception frame; an address registering unit that overwrites and registers the transmission source address of the reception frame on the address specified by the address specifying unit; and a retrieval situation updating unit that updates, when retrieving the address identical with the transmission destination address of the received frame from the learning table, the retrieval situation stored in the retrieval situation storage unit in association with the retrieved address.

2. The repeater according to claim 1, wherein the retrieval situation storage unit stores as the retrieval situation, a retrieval lapse time, which is a lapse time elapses since the address registered in the learning table is last retrieved, in association with each address, the repeater further comprises a retrieval lapse time updating unit that updates each retrieval lapse time stored in the retrieval situation storage unit each time a predetermined time passes, the address specifying unit refers to, when the transmission source address of the received frame is registered in the learning table, the retrieval lapse time of the address stored in association with the port identical with the port that receives the frame among the retrieval lapse times stored in the retrieval situation storage unit, and specifies an address of which the retrieval lapse time is the longest as the address to be overwritten, and the retrieval situation updating unit resets, when the address identical with the transmission destination address of the received frame is retrieved from the learning table, the retrieval lapse time stored in the retrieval situation storage unit in association with the retrieved address.

3. The repeater according to claim 1, wherein the retrieval situation storage unit stores a number of retrievals of the address registered in the learning table as the retrieval situation in association with each address, the repeater further comprises a number-of-retrievals holding unit that counts and holds a number of retrievals of each address registered in the learning table, the address specifying unit refers to, when the transmission source address of the received frame is registered in the learning table, the number of retrievals of the address stored in association with the port identical with the port that receives the frame among the numbers of retrievals stored in the retrieval situation storage unit, and specifies an address of which the number of retrievals is the smallest as the address to be overwritten, and the retrieval situation updating unit updates the number of retrievals stored in the retrieval situation storage unit to the number of retrievals held in the number-of-retrievals holding unit.

4. The repeater according to claim 3, wherein the retrieval situation storage unit stores a retrieval situation parameter indicative of the retrieval situation of the address stored in the learning table in association with each address, the repeater further comprises a retrieval situation parameter computing unit that multiplies an arbitrarily given first ratio by the retrieval situation parameter stored in the retrieval situation storage unit to compute a first multiplication value, multiplies an arbitrarily given second ratio by the number of retrievals counted and held by the number-of-retrievals holding unit to compute a second multiplication value, and adds the first multiplication value to the second multiplication value to compute a new retrieval situation parameter, the address specifying unit refers to, when the transmission source address of the received frame is registered in the learning table, the retrieval situation parameter of the address stored in association with the port identical with the port that receives the frame among the retrieval situation parameters stored in the retrieval situation storage unit, and specifies an address of which a numeric value of the retrieval situation parameter is the lowest as the address to be overwritten, and the retrieval situation updating unit updates the retrieval situation parameter stored in the retrieval situation storage unit to the new retrieval situation parameter computed by the retrieval situation parameter computing unit.

5. The repeater according to claim 1, further comprising a registration lapse time storage unit that stores a registration lapse time that is a lapse time for which each address is held after each address is last registered in the learning table in association with each address registered in the learning table; and a registration lapse time updating unit that updates each registration lapse time stored in the registration lapse time storage unit each time a predetermined time passes, and the address specifying unit multiplies, when the transmission source address of the received frame is registered in the learning table, an arbitrarily given third ratio by the registration lapse time of each address stored in the registration lapse time storage unit in association with the port identical with the port that receives the frame to compute a plurality of third multiplication values, multiplies an arbitrarily given fourth ratio by the retrieval situation of each address stored in association with the port identical with the port that receives the frame among the retrieval situations of each address stored in the retrieval situation storage unit to compute a plurality of fourth multiplication values, adds the third multiplication value and the fourth multiplication value for each address stored in the retrieval situation storage unit in association with the port identical with the port that receives the frame, and specifies an address of which the added value is the lowest as the address to be overwritten.

6. A repeating method comprising: registering in a learning table, each time a reception frame is received, a transmission source address of the reception frame in association with a reception port; retrieving an address identical with a transmission destination address of the reception frame from the learning table to repeat the reception frame via a port corresponding to the retrieved address; storing a retrieval situation of an address retrieved as the address identical with the transmission destination address of the reception frame in association with each address registered in the learning table; specifying an address to be overwritten by the transmission source address of the reception frame by referring to, when registering the transmission source address of the received frame in the learning table, a retrieval situation of an address stored in association with a port identical with a port that receives the frame among retrieval situations stored in the storing; overwriting and registering the transmission source address of the reception frame on the address specified in the specifying; and updating, when retrieving the address identical with the transmission destination address of the received frame from the learning table, the retrieval situation stored in the storing in association with the retrieved address.

7. A non-transitory computer readable storage medium having stored therein a repeating program, the repeating program causing a computer to execute a process comprising: registering in a learning table, each time a reception frame is received, a transmission source address of the reception frame in association with a reception port; retrieving an address identical with a transmission destination address of the reception frame from the learning table to repeat the reception frame via a port corresponding to the retrieved address; storing a retrieval situation of an address retrieved as the address identical with the transmission destination address of the reception frame in association with each address registered in the learning table; specifying an address to be overwritten by the transmission source address of the reception frame by referring to, when registering the transmission source address of the received frame in the learning table, a retrieval situation of an address stored in association with a port identical with a port that receives the frame among retrieval situations stored in the storing; overwriting and registering the transmission source address of the reception frame on the address specified in the specifying; and updating, when retrieving the address identical with the transmission destination address of the received frame from the learning table, the retrieval situation stored in the storing in association with the retrieved address.

* * * * *